Nov. 14, 1944. A. C. LIND ET AL 2,362,909

METHOD OF APPLYING MOLDING STRIPS TO TRIM PANELS

Filed Sept. 22, 1941

INVENTORS
ALVIN C. LIND
ALEXANDER CARLIN
BY Whittemore, Hulbert
& Belknap ATTORNEYS Patented Nov. 14, 1944

2,362,909

UNITED STATES PATENT OFFICE 2,362,909

METHOD OF APPLYING MOLDING STRIPS TO TRIM PANELS

Alvin C. Lind, and Alexander Carlin, Detroit, Mich., assignors to National Automotive Fibres, Inc., Detroit, Mich., a corporation of Delaware Application September 22, 1941, Serial No. 411,940

2 Claims. (Cl. 153—1)

The present invention relates to molding, and more particularly to a method for applying decorative trim molding to trim panels of automotive vehicles.

Heretofore, a decorative effect has been imparted to interior trim panels, particularly of automotive vehicles, by providing a bead or molding strip which generally extends across the trim panel, but which may extend over any portion thereof in any desired direction. In the past these trim moldings have for the most part been formed of a bright metal, or chromium plated.

In the past, two general types of molding strips have been employed. In one a base strip having flanges extending along the side was secured to the panel board in any desired manner, after which a finishing cover strip was snapped over the flanges of the base strip. This type is open to the objection that it has proved impossible to provide a sufficiently secure interlock between the cover strip and the base strip and still retain the "snap-on" feature.

As an alternative of this type, it has been proposed in the past to provide a cover strip which, instead of snapping on, is slid on from one end of the base strip. This type is open to the serious objection that it is impossible to provide finished ends on the cover strip and still preserve the feature of sliding the cover strip on to a base strip.

The second type which has previously been employed, comprises a unitarily finished article which is attached as a unit to the trim panel. This type may be made in several ways, one of which is to provide fastening elements directly on the inside of the molding. Another mode of making this second type of molding strip was to provide separate base strips and cover strips and to assemble the same prior to attaching the base strip to the trim panel. This type of molding strip is open to the objection that openings must be formed in the trim panel for the reception of the fastening elements carried by the molding strip, or, as an alternative, the exterior surface of the molding strip must be subjected to a blow or severe pressure to cause the fastening elements to penetrate the trim panel.

We have devised a new method for assembling a molding strip with a trim panel. Briefly described, our invention comprises the attachment to a trim panel of a base strip having laterally extending flanges, and the application to said base strip of a cover strip which is first adapted to be engaged with the base strip in registry therewith, and is then subjected to a rolling operation which bends flanges of the cover strip inwardly under the flanges of the base strip, so as to provide a definite and positive interlock between the parts.

According to the preferred embodiment of our invention the assembly of the trim panel and molding strip elements is carried out on an assembly line. The trim panels are advanced by means of conveyors underneath guides. The base strips are brought into engagement with the guides and are advanced through them, thereby aligning the base strips with great accuracy on the desired portion of the trim panels. As the base strips and the trim panels are continuously advanced, the base strips pass beneath a stapling device, or equivalent securing means, which locks the base strips to the trim panels. As the trim panel with the now permanently attached base strip advances further along the assembly line, the operator places the cover strip in registering relation over the base strip. Preferably the cover strip is formed so as to have a light snap-on engagement with the base strip. As the assembly continues to advance, the cover strip passes beneath a roller which is adapted to force the cover strip firmly down over the bast strip. Immediately afterwards the cover strip passes past one, or between two or more oppositely directed rollers having flanges formed thereon which are adapted to force and permanently bend the flanges of the cover strip underneath the laterally extending flanges of the base strip, so as to provide a permanent and positive interlock.

By practicing the present invention, it is possible to form the cover strips in a continuous manner from the strip stock in which the material is cut off at the desired length, and the cut-off means may be adapted to form the end of the cover strip to a desirable conformation. Normally, it is desired to have the ends of the cover strips closed and smoothly rounded. The assembly with the trim panel is greatly facilitated, and the molding strips are applied with absolute uniformity, and with great rapidity. In addition, the number of operators required to apply the molding strips to the trim panels is reduced, particularly when it is recalled that in some previous methods the base strip and the molding strip were secured together prior to attachment, thereby requiring separate operations and separate operators.

With the foregoing general description in mind, it is an object of the present invention to provide a trim panel with a molding strip of any design.

It is a further object of the invention to provide a novel method for assembling base strips and cover strips on trim panels.

It is a further object of the present invention to provide trim panels with molding strips by a method which comprises, first securing the base strip to the trim panel, second assembling cover strips on the base strips, and finally rolling the edges of the cover strip into interlocking engagement with the base strip.

Other objects of the invention will be apparent as the description proceeds, and when taken in conjunction with the accompanying drawing, wherein.

In carrying out the method embodying our invention, the base strips such as 183 may be directed by means of guides (not shown) to the proper location upon the trim panels such as P where they may be securely fastened to the trim panels by stapling or wire stitching operations. Any suitable stapling mechanism (not shown) may be employed for stapling or stitching the base strips to the trim panels.

Figure 4:
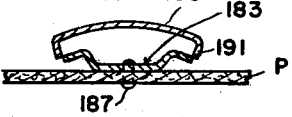

After the base strips 183 are fastened to the trim panels the assembly is carried for a suitable distance by a conveyor with the base strips in exposed condition. At this time the operator takes the channel shaped cover strips 190 and places them in inverted position over the base strips 183, as illustrated in Figure 4. As previously stated, these cover strips are preferably so formed as to have a light snap-on engagement with the base strips, although this is not strictly necessary. The cover strips are complete in that their ends are formed and closed to the desired configuration, which would prevent sliding a cover strip on from one end of a base strip.

Figure 5:
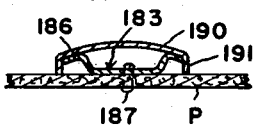

The cover strip 190 is adapted to be engaged and forced downwardly upon the base strip 183 from the position in Figure 4 to the position in Figure 5 by a roller (not shown) having its periphery shaped to correspond to the contour of the cover strip.

Suitable forming rolls (not shown) may be used to roll or clamp the flanges 191 of the cover strip underneath the outwardly extending flanges 186 of the base strip 183, so as to provide a permanent interlock. At the same time this permanent interlock is provided without injury to the preferably brightly finished surface of the cover strip.

Figure 1:
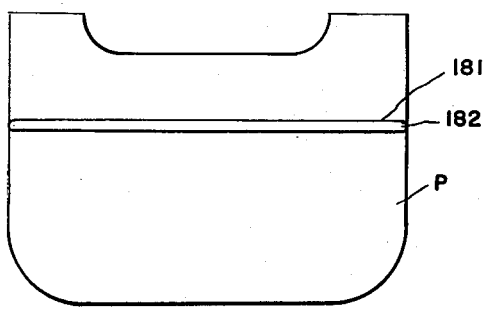
Figure 1 is an elevation of a trim panel provided with the decorative molding of the type described.
Figure 2:
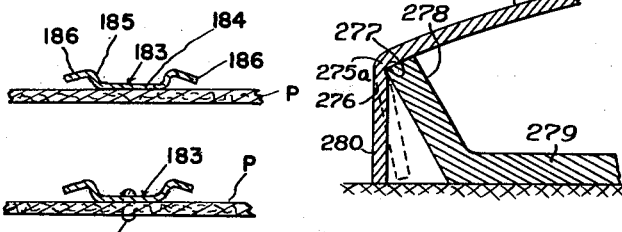
Figures 2 to 6 are progressive views showing steps in the assembly of the decorative molding on a trim panel.

In Figure 1 we have illustrated a trim panel P, which may be of usual type. Trim panels of this type are normally made by covering a fibrous panel board with padding material, and thereafter covering the padding material with a trim fabric which is adhered at its edges to the rear of the panel board. In order to impart a decorative effect to the trim panel P the molding strip assembly 181 is provided, and in Figure 1 we have shown a single one of such strips secured horizontally across substantially the entire width of the trim panel. It will be observed in Figure 1 that the ends of the molding strip assembly are rounded off, as indicated at 182. In Figures 2 to 6 we have indicated successive steps in the assembly of the molding strip on a trim panel P. In Figure 2 we have shown the trim panel P as having a base strip 183 positioned thereon. The base strip 183 has a flat central web 184 and outwardly diverging flanges 185 terminating in downwardly and outwardly inclined flange portions 186.

Figure 3:
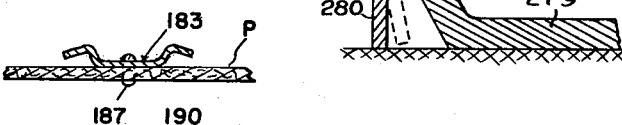

In Figure 3 we have shown the base strip 183 secured to the trim panel P by suitable means such as wire staples or stitches 187.

Figure 6:
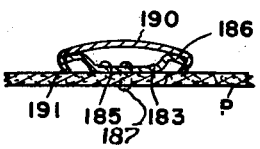

In Figure 4 the cover strip 190 is in its initial position on the base strip 183. As previously stated, the cover strip 190 is provided with downwardly and slightly inwardly inclined flanges 191, the arrangement being such with relation to the flange portions 186 of the base strip 183 that the cover strip 190 has a light snap-on engagement therewith. It is only necessary to provide a temporary inter-engagement between these parts, pending the subsequent provision of the permanent interlock. The operator may if desired force the cover strip 190 downwardly, as shown in Figure 5, or this operation may if desired be performed by a roll (not shown). The next step in the operation is the bending or rolling of the flanges 191, at least partially under the flange portions 186 of the base strip 183. Figure 6 shows the arrangement of molding elements after this step has been completed.

By practicing the present invention it is possible to employ a base strip of a relatively inexpensive material, and to employ a light gauge cover strip formed of a more expensive metal if desired. At the same time, it will be appreciated that the cover strip need not necessarily be of metal, but need only be of a sheet-material which is adapted to take a permanent set as a result of the molding operation. Thus for example, cover strips formed from certain plastics are suitable.

Figure 7:
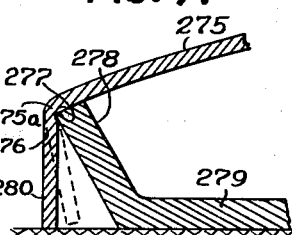
Figure 7 is a more or less diagrammatic sectional view illustrating a preferred form of the invention, in which the flanges of the cover strip are provided with shallow grooves.
Figure 8:
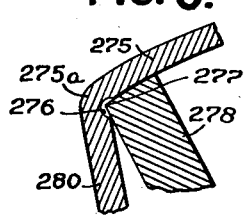
Figure 8 is an enlarged sectional view showing the interlock provided by the groove in the cover strip.

In Figures 7 and 8 we have illustrated a preferred embodiment of the invention, which will now be briefly described. According to this embodiment of the invention the cover strip 275 is provided with grooves 276 along its inner surface at about the point where the inner surface of the cover strip 279 will engage a corner of the base strip. This serves two functions. In the first place, it weakens the cover strip 275 so that when pressure is applied by the rollers the flange of the cover strip will be bent inwardly along the line of weakness, thus providing a more definite interlock. At the same time, the groove thus provided may interfit and engage with the corner of the flange of the base strip.

In Figures 7 and 8 we have shown a somewhat different form of base strip 279, whose function is identical with that previously described.

In Figures 7 and 8 the cover strip 275 is provided at the corner 275a with a longitudinally extending groove 276 which is adapted to receive the outer free edge 277 of the upwardly and outwardly extending flange 278 of the base strip 279. During the rolling operation, the downwardly extending flange 280 of the cover strip 275 is moved from the full line position of Figure 7 to the dotted line position thereof. Due to the groove 276 which provides a line of weakness, the bending of the flange 280 to the dotted line position is concentrated substantially along the line of groove 276. Furthermore, the groove 276 receives the free edge 277 of the base strip, as best seen in Figure 8 so that an interlocking relation between the cover strip 275 and base strip 279 is obtained.

The material of the cover strip 275 is preferably sheet metal, hence the groove 276 will be very shallow. By way of example, excellent results are obtained when the grooves 276 are approximately equal in depth to half the thickness of the material of the cover strip.

While of course the broad invention may be carried out without providing these shallow grooves or lines of weakness, we have found that a much more satisfactory product is obtained when these lines of weakness are provided.

While we have described in considerable detail the specific method which is preferred, it will be understood that this has been done solely to enable those skilled in the art to practice the present invention, the scope of which is indicated by the appended claims.

What we claim as our invention is:

1. The method of assembling a preformed channel-shaped cover strip with a preformed base strip which has a substantially flat base attached to a substantially flat element and has upwardly and outwardly inclined flanges at opposite longitudinal edges of the base, comprising the steps of advancing the element with the attached base strip uppermost in a position to be engaged by the cover strip, forming longitudinally extending grooves in the cover strip at approximately the junction of the side flanges of the channel with the base thereof to provide longitudinally extending weakened areas for bending purposes and for positioning the cover strip in a predetermined position relative to the base strip, placing the channel-shaped cover strip in inverted position upon the base strip so that the side flanges of the channel straddle the flanges of the base strip, forcing the cover strip down upon the base strip until the longitudinally extending grooves in the cover strip receive the outer edges of the flanges of the base strip, and bending without deforming the side flanges of the cover strip inwardly from said grooves underneath the flanges of the base strip to interlock the cover strip to the base strip.

2. In the manufacture of molding strip assemblies, the steps of forming an elongated base strip with a substantially flat base and upwardly and outwardly extending flanges, forming an elongated cover strip for the base strip with a top portion, downwardly extending substantially parallel side portions, and forming longitudinally extending weakened areas in its inner surface at approximately the junction of the side portions with the top portion of the cover strip, placing the cover strip in opposed relation upon the base strip so that the side portions of the cover strip straddle the flanges of the base strip, then forcing the cover strip down upon the base strip until the weakened areas of the cover strip are disposed next to the outer edges of the flanges of the base strip, and then bending opposite side portions of the cover strip inwardly from said weakened areas underneath the flanges of the base strip to interlock the cover strip in opposed relation to the base strip and thereby form a hollow molding structure.

ALVIN C. LIND.
ALEXANDER CARLIN.